US012688976B2

(12) United States Patent
Ishimaru

(10) Patent No.: US 12,688,976 B2
(45) Date of Patent: Jul. 21, 2026

(54) ELECTROLYTIC CAPACITOR HAVING REDUCED EQUIVALENT SERIES RESISTANCE (ESR) AND PRODUCTION METHOD FOR SAME

(71) Applicant: Panasonic Intellectual Property Management Co., Ltd., Osaka (JP)

(72) Inventor: Yoshiaki Ishimaru, Saga Ken (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 162 days.

(21) Appl. No.: 18/725,015

(22) PCT Filed: Dec. 27, 2022

(86) PCT No.: PCT/JP2022/048419
§ 371 (c)(1),
(2) Date: Jun. 27, 2024

(87) PCT Pub. No.: WO2023/127928
PCT Pub. Date: Jul. 6, 2023

(65) Prior Publication Data
US 2025/0062078 A1 Feb. 20, 2025

(30) Foreign Application Priority Data
Dec. 28, 2021 (JP) ................................. 2021-214505

(51) Int. Cl.
*H01G 9/012* (2006.01)
*H01G 9/00* (2006.01)
(Continued)

(52) U.S. Cl.
CPC .......... *H01G 9/012* (2013.01); *H01G 9/0029* (2013.01); *H01G 9/055* (2013.01); *H01G 9/151* (2013.01)

(58) Field of Classification Search
None
See application file for complete search history.

(56) References Cited

U.S. PATENT DOCUMENTS

2017/0133159 A1* 5/2017 Aoyama .............. H01G 9/0032
2020/0006011 A1* 1/2020 Ogawa ..................... H01G 9/15
(Continued)

FOREIGN PATENT DOCUMENTS

JP         56112931 U * 8/1981
JP      S56-112931 U1 8/1981
(Continued)

OTHER PUBLICATIONS

International Search Report dated Mar. 20, 2023 issued in International Patent Application No. PCT/JP2022/048419, with English translation.

*Primary Examiner* — Eric W Thomas
(74) *Attorney, Agent, or Firm* — Rimon P.C.

(57) ABSTRACT

Disclosed is an electrolytic capacitor including: an electrode foil; and a lead member that is connected to the electrode foil. The lead member includes a lead wire and a plate-shaped tab portion that is provided at one end portion of the lead wire. The tab portion has a surface with an arithmetic average roughness Ra of 4 μm or more. The electrode foil and the lead member are connected by a crimping portion in an overlapping portion in which the tab portion and the electrode foil overlap each other when the electrode foil is placed on the surface of the tab portion.

17 Claims, 6 Drawing Sheets

(51) Int. Cl.
     *H01G 9/055*         (2006.01)
     *H01G 9/15*          (2006.01)

(56)               References Cited

U.S. PATENT DOCUMENTS

| | | | |
|---|---|---|---|
| 2020/0168406 A1 | 5/2020 | Yoshida et al. | |
| 2020/0373090 A1 | 11/2020 | Yoshimura et al. | |
| 2024/0194417 A1 * | 6/2024 | Dobai | H01G 9/008 |

FOREIGN PATENT DOCUMENTS

| | | | | |
|---|---|---|---|---|
| JP | S58-148912 A | | 3/1983 | |
| JP | H03-036128 U1 | | 4/1991 | |
| JP | 2009-130338 A | | 6/2009 | |
| JP | 2014197614 A | * | 10/2014 | |
| JP | 2019-036648 A | | 3/2019 | |
| WO | WO-2012105124 A1 | * | 8/2012 | H01G 9/008 |
| WO | 2019/167773 A1 | | 9/2019 | |

* cited by examiner

ELECTROLYTIC CAPACITOR HAVING REDUCED EQUIVALENT SERIES RESISTANCE (ESR) AND PRODUCTION METHOD FOR SAME

CROSS-REFERENCE OF RELATED APPLICATIONS

This application is the U.S. National Phase under 35 U.S.C. § 371 of International Patent Application No. PCT/JP2022/048419, filed on Dec. 27, 2022, which in turn claims the benefit of Japanese Patent Application No. 2021-214505, filed on Dec. 28, 2021, the entire disclosures of which Applications are incorporated by reference herein.

TECHNICAL FIELD

The present disclosure relates to an electrolytic capacitor and a method for producing the same, and more particularly to a method for connecting a lead member and an anode body.

BACKGROUND ART

An electrolytic capacitor includes: an anode foil that has a roughened surface; and a lead member that is connected to the anode foil. The anode foil and the lead member are connected to each other by placing a flat tab portion of the lead member on the anode foil to form an overlapping portion, perforating the overlapping portion at a predetermined position from the tab portion side to form a through hole, and crimping a petal-shaped crimping piece formed around the through hole (for example, Patent Literature 1).

CITATION LIST

Patent Literature

[PTL 1] Japanese Laid-Open Patent Publication No. 2009-130338

SUMMARY OF INVENTION

Technical Problem

The flat tab portion has a relatively smooth surface, and thus a positional offset may occur between the anode foil and the tab portion when connecting the anode foil and the lead member. In addition, the tab portion is unlikely to form contact points with the roughened surface of the anode foil. For this reason, the resistance at a connection portion between the anode foil and the lead member may be large, and therefore there is still room for reducing equivalent series resistance (ESR) in the electrolytic capacitor.

Solution to Problem

One aspect of the present disclosure relates to an electrolytic capacitor including: an electrode foil; and a lead member that is connected to the electrode foil, wherein the lead member includes a lead wire and a plate-shaped tab portion that is provided at one end portion of the lead wire, the tab portion has a surface with an arithmetic average roughness Ra of 4 μm or more, and the electrode foil and the lead member are connected by a crimping portion in an overlapping portion in which the tab portion and the electrode foil overlap each other when the electrode foil is placed on the surface of the tab portion.

Another aspect of the present disclosure relates to a method for producing an electrolytic capacitor including: a first step of preparing an electrode foil: a second step of obtaining a lead member that includes a lead wire and a plate-shaped tab portion that is provided at one end portion of the lead wire and has a surface with an arithmetic average roughness Ra of 4 μm or more; and a third step of placing the electrode foil on a surface of the tab portion to form an overlapping portion in which the tab portion and the electrode foil overlap each other, perforating the tab portion in the overlapping portion at a predetermined position, and crimping the electrode foil and the tab portion to connect the electrode foil and the lead member to each other.

Advantageous Effects of Invention

According to the present disclosure, the ESR of the electrolytic capacitor can be reduced.

Novel features of the present invention are set forth in the appended claims. However, the present invention will be well understood from the following detailed description of the present invention with reference to the drawings, in terms of both the configuration and the content together with other objects and features of the present invention.

BRIEF DESCRIPTION OF DRAWINGS

FIG. 4 shows an enlarged cross-sectional view of a relevant part of an overlapping portion, with FIG. 4(*a*) showing a state before perforation, FIG. 4(*b*) showing a state after perforation, and FIG. 4(*c*) showing a state after pressing.

FIG. 6 is a partially exploded perspective view of a spirally wound body.

DESCRIPTION OF EMBODIMENT

Figure 1:
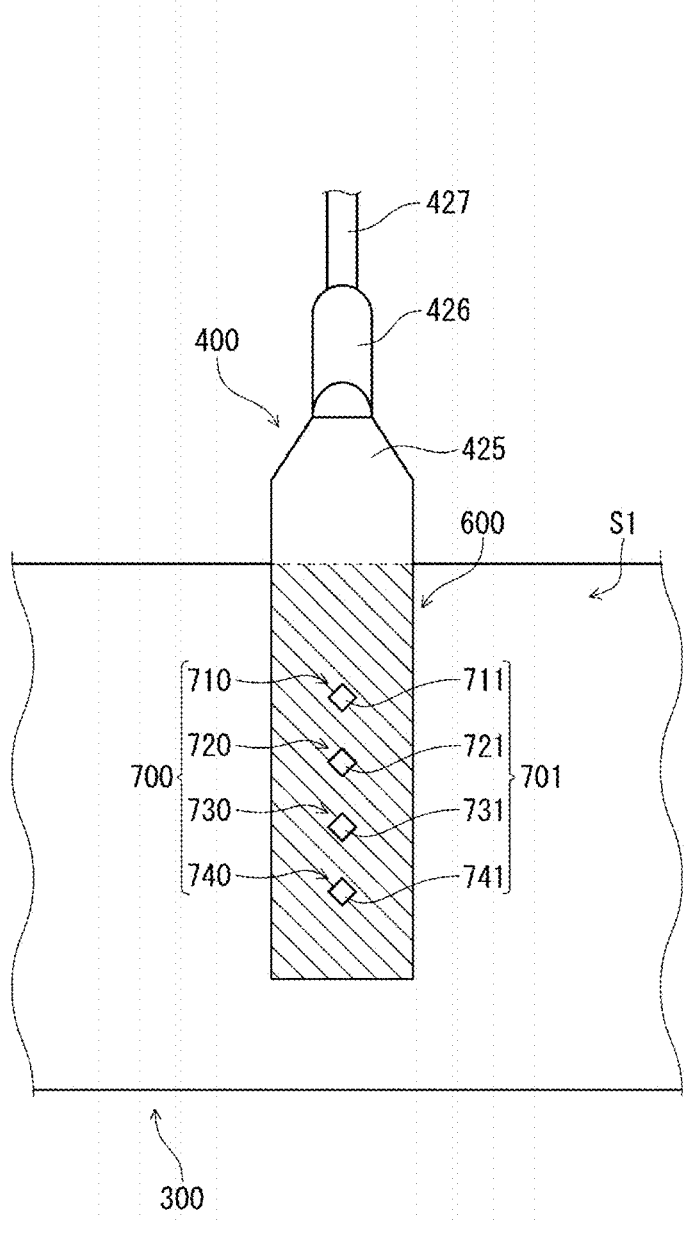
FIG. 1 is a plan view of a relevant part of an anode foil and a lead member connected in a third step of a method for producing an electrolytic capacitor according to an embodiment of the present disclosure, as viewed from the lead member side.

Hereinafter, an embodiment of the present disclosure will be described by way of an example. However, the present disclosure is not limited to the example given below. In the following description, specific numerical values and materials may be listed as examples. However, other numerical values and materials may also be used as long as the advantageous effects of the present disclosure can be obtained. In the specification of the present application, the expression "a range of a numerical value A to a numerical value B" means that the range includes the numerical value A and the numerical value B, and can also be interpreted as "a numerical value A or more and a numerical value B or less". In the following description, lower and upper limits of numerical values of specific physical properties, conditions, and the like will be shown. The lower limits and the upper limits shown below can be combined in any way as long as the lower limits are not greater than or equal to the upper limits. In the case where a plurality of materials are listed, only one material may be selected from among the plurality of materials, or a combination of two or more may be selected from among the plurality of materials.

An electrolytic capacitor according to an embodiment of the present disclosure includes an electrode foil and a lead member that is connected to the electrode foil. The lead member includes a lead wire and a plate-shaped tab portion that is provided at one end portion of the lead wire. The tab portion has a surface with an arithmetic average roughness Ra of 4 µm or more. The electrode foil and the lead member are connected to each other by a crimping portion in an overlapping portion in which the tab portion and the electrode foil overlap each other when the electrode foil is placed on the surface of the tab portion.

In the case where the surface of the tab portion has a rough surface with an arithmetic average roughness Ra of 4 µm or more, in the overlapping portion (crimping portion), many contact points are formed between the electrode foil and the tab portion. As a result, deterioration of the connection portion caused by a large electric current locally flowing through a few contact points during production or use of the electrolytic capacitor is suppressed. When forming the overlapping portion and when forming the crimping portion, the positional offset between the tab portion and the electrode foil is suppressed, and thus the crimping portion is formed in a stable manner. As a result, the resistance at the connection portion (crimping portion) between the tab portion and the electrode foil is reduced, and the ESR of the electrolytic capacitor is reduced.

Also, in the case where the tab portion has a surface with a maximum height roughness Rz of 30 µm or more as well, the resistance at the connection portion (crimping portion) between the tab portion and the electrode foil is also reduced. The surface of the tab portion has a maximum height roughness Rz of preferably 30 µm or more, and more preferably 50 µm or more. It is more preferable that the surface of the tab portion has an arithmetic average roughness Ra of 4 µm or more and a maximum height roughness Rz of 30 µm or more.

A tab portion that has a surface with an arithmetic average roughness Ra of 4 µm or more (or a maximum height roughness Rz of 30 µm or more) (hereinafter, the surface will also be referred to as "surface S") is preferably used to connect to, for example, an anode foil used in a medium-voltage or high-voltage electrolytic capacitor that has a rated voltage of 160 V or more. In this anode foil, a porous portion in the surface of the anode foil has a relatively large thickness and includes a tunnel-shaped pit, and thus contact points are less likely to be formed between the anode foil and the tab portion, and the resistance is likely to increase at the crimping portion. Accordingly, in the medium-voltage or high-voltage electrolytic capacitor, the effect of reducing ESR produced by the surface S of the tab portion is remarkably obtained.

With the tab portion that has the surface S, the resistance at the connection portion (crimping portion) between the tab portion and the electrode foil can be reduced to, for example, 1.0 mΩ or less, or 0.5 mΩ or less. The resistance at the crimping portion is determined by measuring resistance value between an arbitrarily selected point in the vicinity of the crimping portion in the electrode foil and an arbitrarily selected point in a region of the crimping portion in the tab portion based on the contact four-terminal measurement method. In the case where a plurality of crimping portions are formed in the overlapping portion, the average value of resistance of the plurality of crimping portions may be determined. As used herein, the expression "the vicinity of the crimping portion in the electrode foil" refers to, in the case of a crimping portion 710 shown in FIGS. 1, 2, and 4(c), a surface (the surface shown in FIG. 2) of an electrode foil 300 that is close to a crimping piece 712. The expression "a region of the crimping portion in the tab portion" refers to, in the case of the crimping portion 710, an inner region of a circle that has, as the radius, a line segment that connects the center of a through hole 711 and a position of the crimping piece 712 that is the farthest from the center of the through hole 711 when an overlapping portion 600 is viewed from tab portion 425 side. For example, the resistance between two portions indicated by arrows P1 and P2 shown in FIG. 4(c) is measured.

The arithmetic average roughness Ra of the surface of the tab portion may be 4 µm or more, or 8 µm or more. From the viewpoint of connection strength, the arithmetic average roughness Ra of the surface of the tab portion may be 4 µm or more (or 8 µm or more) and 50 µm or less. The surface S may be provided only on one surface of the plate-shaped tab portion (the surface on which an electrode foil is placed) or both surfaces of the tab portion. The arithmetic average roughness Ra and the maximum height roughness Rz are indicators of surface roughness determined in accordance with the Japanese Industrial Standards JIS B 0601: 2013.

The arithmetic average roughness Ra and the maximum height roughness Rz of the surface of the tab portion are determined in the following manner.

In an arbitrarily selected region (for example, a 700 µm×530 µm region) in the surface of the tab portion, the arithmetic average roughness Ra and the maximum height roughness Rz are measured by using a laser microscope (model number: VK-X200 at a lens magnification of 20 times) available from Keyence Corporation. Each measurement is performed on three to five samples, and the average value of the measured values is obtained.

The tab portion may have a thickness of 100 µm or more, or 100 µm or more and 500 µm or less. In the case of a medium-voltage or high-voltage electrolytic capacitor, the tab portion that is connected to the anode foil may have a thickness of 200 µm or more, or 200 µm or more and 300 µm or less.

From the viewpoint of suppressing deterioration (corrosion and the like) of the connection portion between the tab portion and the electrode foil, the surface of the tab portion is preferably covered with an oxide coating film (second oxide coating film). The oxide coating film that covers the surface of the tab portion may have a thickness of, for example, 280 nm or more, 280 nm or more and 1000 nm or less, or 450 nm or more and 1000 nm or less. Even when the oxide coating film has a relatively large thickness, with the surface S of the tab portion, contact points are sufficiently formed between the tab portion and the electrode foil, and the resistance at the crimping portions is reduced.

(Electrode Foil)

The electrode foil includes a metal foil that contains a first metal. The first metal includes a valve metal. Examples of the valve metal include aluminum, tantalum, niobium, titanium, and the like. The metal foil may contain the valve metal in the form of an alloy that contains the valve metal, a compound that contains the valve metal, or the like.

From the viewpoint of achieving a high capacity, a surface of the metal foil may be roughened. Specifically, the metal foil may include a porous portion and a core portion that is continuous with the porous portion. The porous portion has a pit (or a pore) surrounded by a metal skeleton that constitutes the porous portion. The pit has a most frequent pore size of, for example, 50 nm or more. The porous portion is formed by roughening the surface of the metal foil through etching processing or the like. The porous portion refers to an outer portion of the metal foil formed to be porous through etching processing, and the remaining inner portion of the metal foil is referred to as "core portion". The etching processing may be performed by electrolytic etching or chemical etching. In the case of electrolytic etching, the thickness of the porous portion, the shape and the size of the pit (or the pore), and the like can be adjusted by adjusting etching conditions (the number of steps performed in etching processing, time, current density, the composition and the temperature of etching solution, and the like).

The thickness of the porous portion is not particularly limited, and may be selected as appropriate based on the application of the electrolytic capacitor, the required withstand voltage, and the like. The thickness per side of the porous portion may be, for example, $1/10$ or more and $4/10$ or less of the thickness of the electrode foil. The thickness of the porous portion is determined by obtaining an SEM image of a cross section of the porous portion of the electrode foil in the thickness direction, and calculating the average value of thickness values measured at ten arbitrarily selected points. The thickness of a dielectric layer and the thickness of a cover layer, which will be described later, are also determined in the same manner.

The electrode foil may be used as an anode foil or a cathode foil. Hereinafter, a lead member that is connected to the anode foil will also be referred to as "anode lead member". A lead member that is connected to the cathode foil will also be referred to as "cathode lead member".

(Anode Foil)

The anode foil includes a metal foil that includes a porous portion in a surface thereof and a dielectric layer that covers the porous portion. The dielectric layer covers at least a portion of the surface of the metal skeleton that constitutes the porous portion. The dielectric layer covers at least a portion of an inner wall of the pit (or the pore) surrounded by the metal skeleton that constitutes the porous portion. The dielectric layer is obtained by, for example, forming an oxide coating film on the roughened surface of the metal foil through a chemical conversion treatment (anodization). The dielectric layer may contain a valve metal oxide.

For example, an anode foil used in a medium-voltage or high-voltage electrolytic capacitor that has a rated voltage of 160 V or more has a relatively large thickness, and the porous portion of the anode foil has a relatively large thickness and includes a tunnel-shaped pit. In this case, the thickness of the anode foil is, for example, 75 μm or more, or 75 μm or more and 200 μm or less, and may be 90 μm or more and 150 μm or less. The thickness of the porous portion is, for example, 20 μm or more, or 25 μm or more, and may be 20 μm, 50 μm or less, or 25 μm or more (or 30 μm or more) and 50 μm or less. Also, in this case, the dielectric layer also has a relatively large thickness. The thickness of the dielectric layer is, for example, 280 nm or more, or 450 nm or more, and may be 280 nm or more (or 450 nm or more) and 1000 nm or less. As used herein, the term "the thickness of the dielectric layer" refers to the thickness of the dielectric layer that covers the outer surface of the porous portion.

From the viewpoint of easily forming a thick dielectric layer that extends to the pit depth, easily obtaining an anode foil favorably used in a medium-voltage or high-voltage electrolytic capacitor, and causing an electrolyte to easily permeate to the pit depth, the porous portion may include a plurality of tunnel-shaped pits that extend in the thickness direction of the porous portion. As used herein, the expression "a plurality of tunnel-shaped pits that extend in the thickness direction of the porous portion" means that the direction in which the tunnel-shaped pits extend is parallel to the thickness direction of the porous portion or inclined at an angle of 80° or less relative to the thickness direction of the porous portion. That is, the angle (acute angle) formed by the direction in which the tunnel-shaped pits extend and the thickness direction of the porous portion is 0° or more and 80° or less, and may be 0° or more and 45° or less, 0° or more and 30° or less, or 0° or more and 15° or less. The expression "a plurality of tunnel-shaped pits that extend in the thickness direction of the porous portion" can also mean that the tunnel-shaped pits extend from the surface side of the porous portion toward the core portion side.

From the viewpoint of easily forming a thick dielectric layer that extends to the pit depth and the like, the tunnel-shaped pits have a most frequent pore size of, for example, 50 nm or more, or 100 nm or more, and may be 100 nm or more and 2100 nm or less, or 200 nm or more (or 500 nm or more) and 2100 nm or less. The most frequent pore size of the tunnel-shaped pits is the most frequent pore size in a volume-based pore size distribution obtained through measurement using a mercury porosimeter.

The tunnel-shaped pits may have a shape such as a columnar shape (for example, a cylindrical shape or a prism shape such as a quadrangular prism shape), a cone shape (for example, a circular cone shape or a pyramid shape such as a square pyramid shape), or a truncated cone shape (for example, a circular truncated cone shape or a truncated pyramid shape such as a truncated square pyramid shape). The tunnel-shaped pits may be branched. In the porous portion on one surface side, a portion of the tunnel-shaped pits may extend to the core portion, and may further extend to the porous portion on the other surface side.

The pits may have a sponge shape. The sponge-shaped pits may have a most frequent pore size of 50 nm or more and 500 nm or less, or 80 nm or more and 300 nm or less. In the case where the pits have a sponge shape, the most frequent pore size of the pits is the most frequent pore size in a volume-based pore size distribution obtained through measurement using a gas adsorption method.

(Cathode Foil)

The cathode foil includes a metal foil that contains a first metal. The metal foil may have a roughened surface, or may be a plain foil. The cathode foil may include the metal foil and a cover layer that covers a surface of the metal foil. The cover layer is provided for the purpose of, for example, improving corrosion resistance, reducing ESR, and the like. The cover layer contains at least one of a second metal and carbon. Examples of the second metal include titanium, nickel, tantalum, niobium, and the like. The second metal may be the same as or different from the first metal. The cover layer may include at least one selected from the group consisting of a metal oxide layer, a metal nitride layer, a metal carbide layer, and a conductive layer. In the cover layer, the second metal may be contained in the form of a metal oxide, a metal nitride, or a metal carbide. The conductive layer may be a carbon layer. The metal oxide may be a chemical conversion film formed through a chemical conversion treatment.

The thickness of the cathode foil is, for example, 20 μm or more and 60 μm or less. The thickness of the cover layer is, for example, 0.03 μm or more and 3 μm or less. As used herein, the term "the thickness of the cover layer" refers to, in the case where the metal foil includes a porous portion in its surface, the thickness of the cover layer that covers the outer surface of the porous portion.

Figure 5:
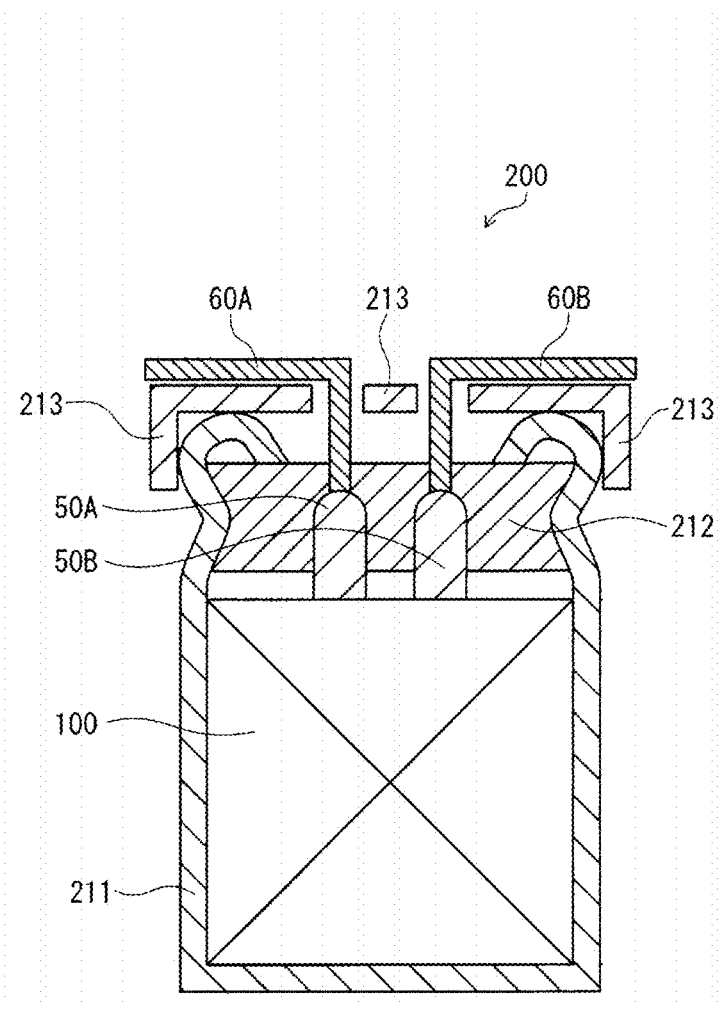
FIG. 5 is a cross-sectional view schematically showing an electrolytic capacitor according to an embodiment of the present disclosure.
Figure 6:
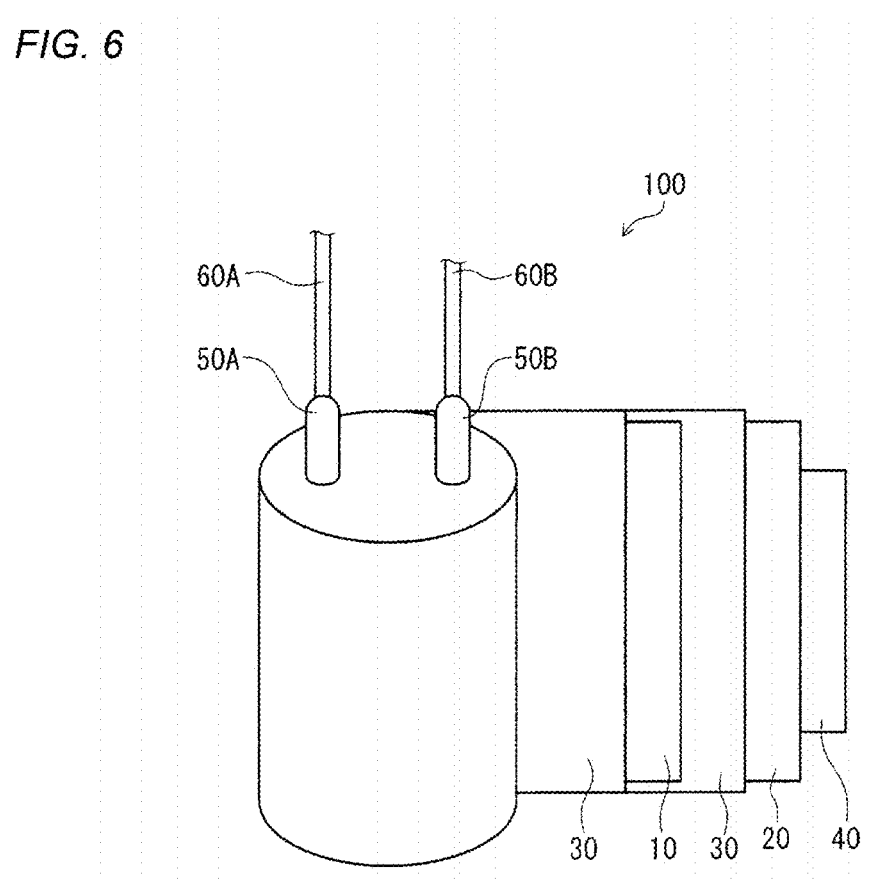

FIG. 5 is a cross-sectional view schematically showing an electrolytic capacitor according to an embodiment of the present disclosure. FIG. 6 is a partially exploded perspective view of a spirally wound body.

An electrolytic capacitor 200 includes a spirally wound body 100. The spirally wound body 100 is formed by spirally winding an anode foil 10 and a cathode foil 20 with a separator 30 interposed therebetween.

One end portions of lead tabs 50A and 50B are connected to the anode foil 10 and the cathode foil 20, respectively, and the anode foil 10 and the cathode foil 20 are spirally wound with the lead tabs 50A and 50B being on the inside, and the spirally wound body 100 is thereby formed. Lead wires 60A and 60B are connected to the other end portions of the lead tabs 50A and 50B, respectively.

The connection between the anode foil 10 and the lead tab 50A (tab portion) and/or the connection between the cathode foil 20 and the lead tab 50B (tab portion) are performed by a method for producing an electrolytic capacitor according to the present disclosure.

Fixing tape 40 is attached to an outer surface of the cathode foil 20 that is located at the outermost of the spirally wound body 100, and an end portion of the cathode foil 20 is fixed by the fixing tape 40. In the case where the anode foil 10 is prepared by cutting out from a large foil, a chemical conversion treatment may be performed on the spirally wound body 100 to form a dielectric layer on the cut plane.

The spirally wound body 100 contains an electrolyte. A capacitor element can be obtained by an electrolyte being contained in the spirally wound body. The electrolyte is provided between the anode foil 10 (dielectric layer) and the cathode foil. For example, a solid electrolyte may be contained in the spirally wound body by impregnating the spirally wound body with a treatment liquid that contains a conductive polymer. The impregnation may be performed under reduced pressure, for example, in an atmosphere of 10 kPa to 100 kPa. An electrolyte solution may be further contained in the spirally wound body.

The spirally wound body 100 is housed in a bottomed case 211 such that the lead wires 60A and 60B are located on the opening side of the bottomed case 211. As the material of the bottomed case 211, a metal such as aluminum, stainless steel, copper, iron, or brass, or an alloy thereof can be used.

A sealing member 212 is provided in an opening portion of the bottomed case 211 in which the spirally wound body 100 is housed, and an opening end of the bottomed case 211 is curled by crimping the opening end of the bottomed case 211 onto the sealing member 212, and placing a cover plate 213 on the curled portion. In this way, the spirally wound body 100 is sealed in the bottomed case 211.

There is no particular limitation on the separator 30. For example, a non-woven fabric or the like that contains fibers of cellulose, polyethylene terephthalate, vinylon, polyamide (for example, an aliphatic polyamide or an aromatic polyamide such as aramid) may be used.

The sealing member 212 is formed such that the lead wires 60A and 60B can pass therethrough. The sealing member 212 may be made of an insulating material, and is preferably an elastic body. In particular, it is preferable to use a highly heat resistant material such as silicone rubber, fluorine rubber, ethylene propylene rubber, hypalon rubber, butyl rubber, or isoprene rubber.

The electrolyte contains at least one of a solid electrolyte and an electrolyte solution. The electrolyte solution contains a solvent and a solute (for example, an organic salt). The solid electrolyte may be used together with a solvent. The solid electrolyte contains a conductive polymer such as poly (3,4-ethylenedioxythiophene) (PEDOT). The solid electrolyte may contain a dopant such as polystyrene sulfonic acid (PSS) together with the conductive polymer.

[Method for Producing Electrolytic Capacitor]

A method for producing an electrolytic capacitor according to an embodiment of the present disclosure includes a first step, a second step, and a third step. In the first step, an electrode foil is prepared. In the second step, a lead member is obtained, the lead member including a lead wire and a plate-shaped tab portion that is provided at one end portion of the lead wire and has a surface with an arithmetic average roughness Ra of 4 μm or more. In the third step, the electrode foil is placed on the surface of the tab portion to form an overlapping portion in which the tab portion and the electrode foil overlap each other. Then, the tab portion in the overlapping portion is perforated at a predetermined position, and the electrode foil and the tab portion are crimped to connect the electrode foil and the lead member to each other.

(First Step)

In the first step, an electrode foil is prepared as an anode foil and/or a cathode foil.

(Second Step)

In the case where an electrode foil is prepared as an anode foil in the first step, in the second step, a lead member may be obtained as an anode lead member. In the case where an electrode foil is prepared as a cathode foil in the first step, in the second step, a lead member may be obtained as a cathode lead member.

The lead member may include a tab portion, a lead wire, and a connection member for connecting the tab portion and the lead wire. In this case, in the second step, for example, a rod-shaped metal material is prepared, and one end of the metal material is flattened through pressing or the like to form the tab portion. The other end of the rod-shaped metal material is used as is as the connection member. The other end (rod-shaped portion) used as the connection member is connected to the lead wire through welding or the like. As the rod-shaped metal material, for example, an iron wire such as a CP wire, or a copper wire such as an OFC wire is used.

The surface of the tab portion may be subjected to roughening processing. The roughening processing is performed by, for example, etching processing, sanding, or the like. Through this processing, the surface S can be formed. The roughening processing may be performed, for example, before connecting the lead wire and the tab portion via the connection member or after connecting the lead wire and the tab portion via the connection member. As the etching processing, electrolytic etching or chemical etching may be performed. The surface roughness of the tab portion can be adjusted by adjusting etching conditions (the number of steps performed in etching processing, current density, the composition and the temperature of etching solution, and the like).

From the viewpoint of suppressing deterioration (corrosion and the like) of the connection portion (crimping portion) between the tab portion and the electrode foil, the surface of the tab portion may be subjected to a chemical conversion treatment. In this case, the surface of the tab is covered with an oxide coating film. Depending on chemical conversion treatment conditions (chemical conversion voltage, the composition and the temperature of chemical conversion solution, and the like), forming an oxide coating film may contribute to roughening of the surface of the tab portion.

Also, the surface of the tab portion may be roughened through first through roughening processing, and after that, an oxide coating film may be formed on the roughened surface through a chemical conversion treatment.

(Third Step)

Figure 2:
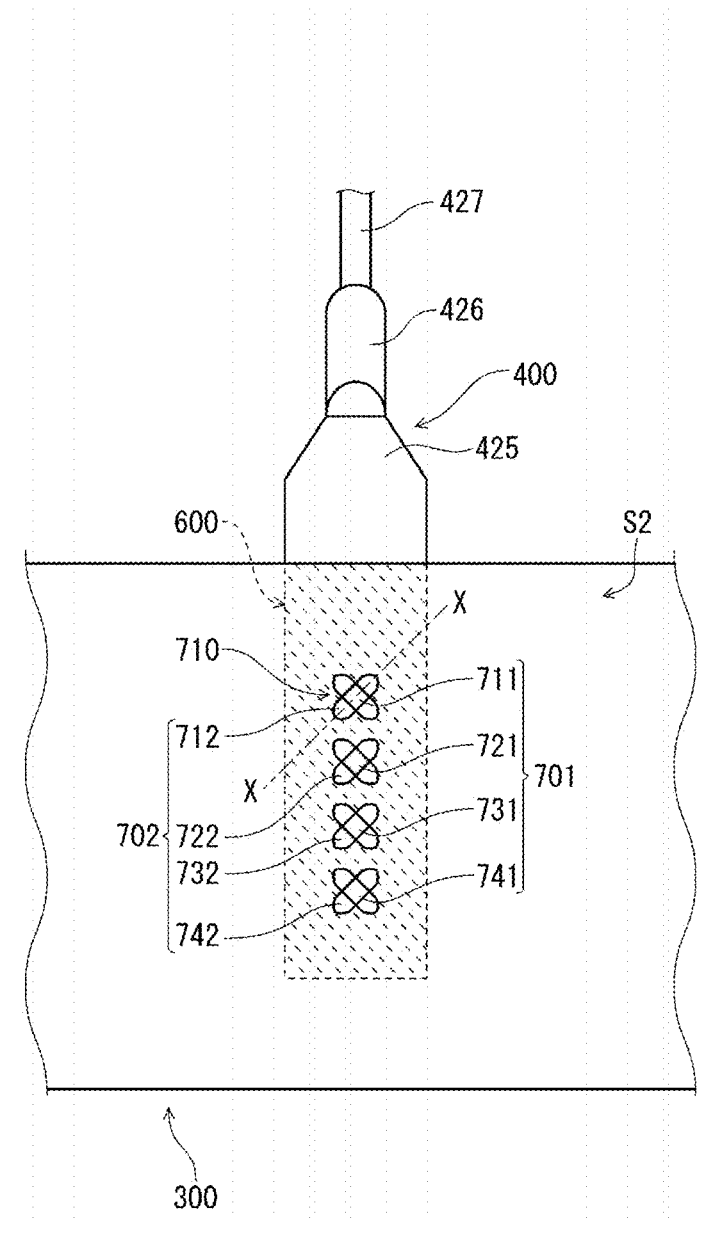
FIG. 2 is a plan view of the relevant part of the anode foil and the lead member connected in the third step of the method for producing an electrolytic capacitor according to the embodiment of the present disclosure, as viewed from the anode foil side.

Here, an example of an anode foil and a lead member connected in the third step will be described with reference to FIGS. 1 and 2. FIG. 1 is a plan view of an anode foil and a lead member as viewed from the lead member side. FIG. 2 is a plan view of the anode foil and the lead member as viewed from the anode foil side.

An anode foil 300 includes: a core portion 311 that is the remaining metal structure of a metal foil that was not etched in etching processing: a porous portion 312 (including 312a and 312b) that is continuous with the core portion 311; and a dielectric layer (not shown) that covers a surface of the porous portion 312. A lead member 400 includes a flat tab portion 425 that has a surface S, a connection member 426, and a lead wire 427.

An overlapping portion 600 is formed by placing the anode foil 300 on the tab portion 425. In FIG. 1, for the sake of convenience, the overlapping portion 600 is hatched. FIG. 1 shows the overlapping portion 600 as viewed from the lead member 400 side.

The anode foil 300 and the tab portion 425 of the lead member 400 are connected by four crimping portions 700 (a first crimping portion 710, a second crimping portion 720, a third crimping portion 730, and a fourth crimping portion 740) in the overlapping portion 600. Each of the plurality of crimping portions 700 includes one through hole 701 (711, 721, 731, or 741) that extends through the anode foil 300 and the lead member 400.

Each through hole 701 has an inner surface that is mainly formed by the lead member 400 being bent toward the anode foil 300 side, and a portion of the through hole 701 may be formed by the anode foil 300 being exposed. The through hole 701 is a region in which none of the lead member 400 and the anode foil 300 is present when the crimping portion 700 is viewed from a direction normal to one main surface of the anode foil 300. An outer circumference of the through hole 701 is an annular line formed when the through hole 701 is projected onto the main surface of the anode member. In FIG. 1, four through holes 701 (711, 721, 731, and 741) are arranged in one line. However, the arrangement of the through holes 701 is not limited thereto.

Each of the plurality of crimping portions 700 includes a crimping piece 702 (712, 722, 732, or 742) formed around a circumferential edge of the through hole 701. The tab portion 425 is placed on one side (surface S1 side) of the anode foil 300, and the crimping piece 702 is formed on the other side (surface S2 side) of the anode foil 300. In the tab portion 425, at least a surface thereof that opposes the surface S1 of the anode foil 300 that is one side of the anode foil 300 is a surface S.

The third step includes perforation processing and pressing processing.

Figure 3:
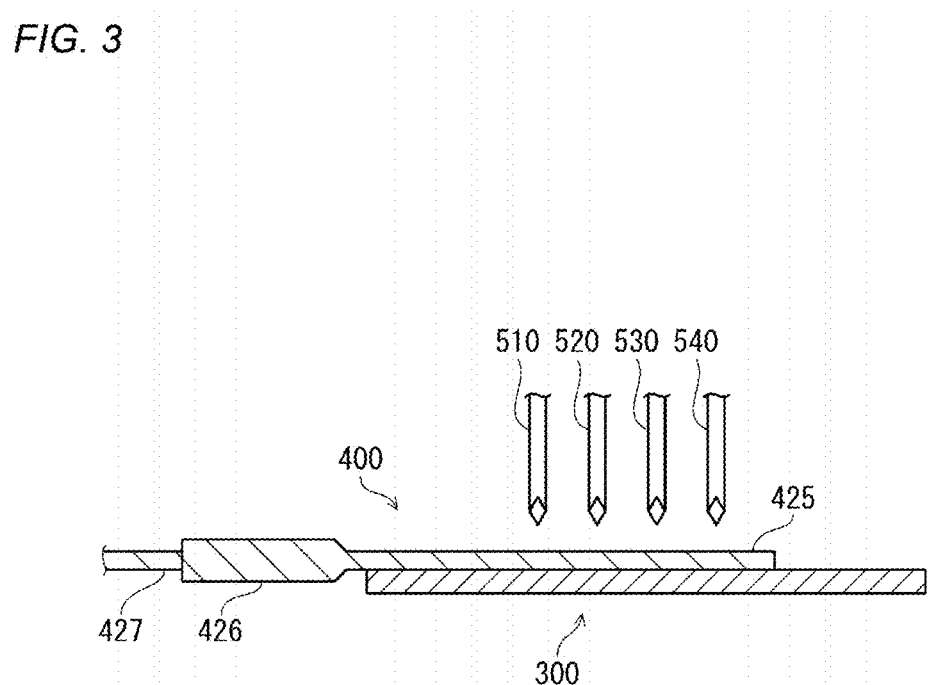
FIG. 3 is a cross-sectional view schematically showing the anode foil and the lead member during perforation processing of the third step.

Hereinafter, the perforation processing and the pressing processing performed in the third step will be described with reference to FIGS. 3 and 4. FIG. 3 is a cross-sectional view schematically showing the anode foil 300 and the lead member 400 during perforation processing of the third step.

Figure 4:
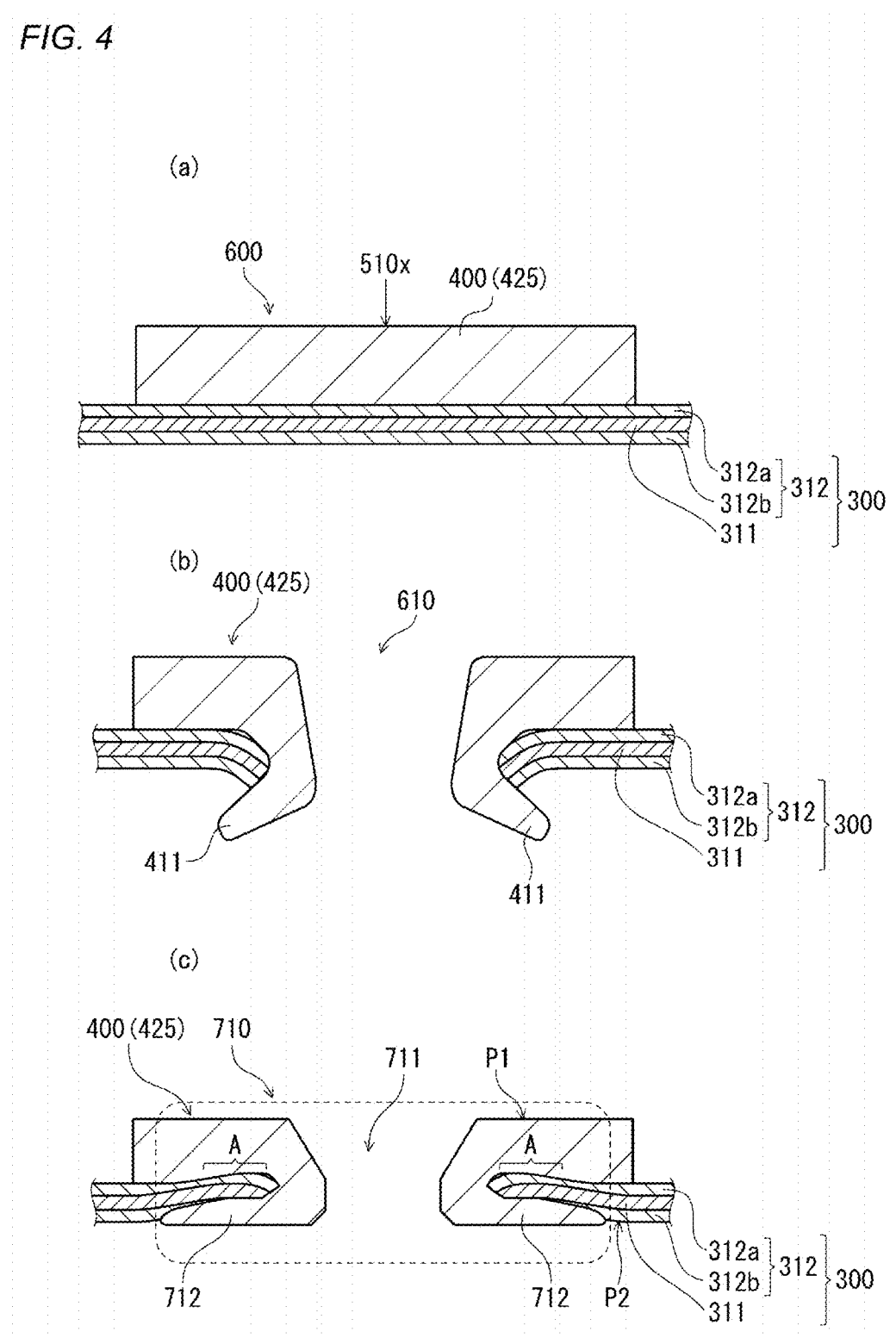

FIG. 4 schematically shows a process of forming a first crimping portion 710 as a representative example of the crimping portions 700. FIG. 4 shows an enlarged cross-sectional view of the vicinity of a perforation position in the overlapping portion 600 at which a through hole is formed through perforation using a needle-shaped member 510, with FIG. 4(a) showing a state before perforation, FIG. 4(b) showing a state after perforation, and FIG. 4(c) showing a state after pressing. FIG. 4(c) shows a cross section taken along the X-X direction shown in FIG. 2. The second crimping portion 720, the third crimping portion 730, and the fourth crimping portion 740 are also formed in the same processing as the first crimping portion 710.

In the third step, the crimping portions 700 (the first crimping portion 710, the second crimping portion 720, the third crimping portion 730, and the fourth crimping portion 740) are formed though perforation processing performed by using needle-shaped members 510 to 540 and pressing processing performed after the perforation processing. Hereinafter, as a representative example, an example will be shown in which the first crimping portion 710 is formed through perforation processing performed by using the needle-shaped member 510 and pressing processing performed after the perforation processing.

(Perforation Processing)

In the perforation processing, the overlapping portion 600 is perforated at a predetermined position 510x using the needle-shaped member 510. The perforation may be performed from the anode foil 300 side or from the lead member 400 side (the tab portion 425 side). In the illustrated example, the perforation is performed from the lead member 400 side (the tab portion 425 side). As the needle-shaped member 510, a square gimlet that has a square cross section at its tip end is used.

FIG. 4(b) shows the overlapping portion 600 after perforation. An opening 610 that extends through the anode foil 300 and the lead member 400 is formed at the perforation position perforated by the needle-shaped member 510. A protruding portion 411 is formed around the opening 610, the protruding portion 411 being a portion of the lead member 400 that protrudes toward the anode foil 300 side.

In this example, a square gimlet that has a square cross section at its tip end is used as the needle-shaped member 510. Accordingly, the opening 610 is formed as a result of the lead member 400 and the anode foil 300 being ruptured along the corners of the square cross section at the tip end of the needle-shaped member 510. Also, the protruding portion 411 has a four-petal shape that extends in four directions. A needle-shaped member that has a different cross sectional shape may also be used.

(Pressing Processing)

After the perforation processing, pressing processing is performed on the overlapping portion 600. In the pressing processing, the overlapping portion 600 is pressed at a pressure of, for example, 8 to 12 MPa. The pressing time is not particularly limited, but may be, for example, about 0.3 seconds to 1 second.

FIG. 4(c) shows the overlapping portion 600 after pressing. As a result of the overlapping portion 600 being pressed in the thickness direction of the anode foil 300, the anode foil 300 and the lead member 400 around the opening 610 are deformed together with the protruding portion 411, and a through hole 711 is thereby formed. An outer circumference of the through hole 711 is formed by the crimping piece 712. The crimping piece 712 is formed as a result of the lead member 400 around the protruding portion being bent from a surface of the anode foil 300 on the porous portion 312a side toward a surface of the anode foil 300 on the porous portion 312*b* side, and folded along the porous portion 312*b*.

The cross-sectional shape of the crimping piece 712 varies depending on from which direction the cross section of the crimping portion 710 is viewed. FIG. 4(*c*) shows a cross section of the crimping piece 712 when the lead member 400 around the protruding portion being bent and folded along the porous portion 312*b* has a maximum length.

The anode foil 300 is strongly pressed against the lead member 400 by the crimping piece 712 and press bonded to the lead member 400. Through the press bonding, the anode foil 300 and the lead member 400 are electrically connected. For example, in the case where the anode foil that has a thin dielectric layer on a surface thereof is connected to the tab portion that has a thin oxide coating film on a surface thereof, due to the overlapping portion being pressed, contact points are formed between the metal structure of the anode foil located on the inner side of the dielectric layer and the metal structure of the tab portion located on the inner side of the oxide coating film. In a surface of a region A of the tab portion 425 shown in FIG. 4(*c*), more contact points are likely to be formed between the anode foil 300 and the tab portion 425.

In FIG. 3, an example is shown in which the overlapping portion is simultaneously perforated at predetermined four positions by simultaneously using four needle-shaped members 510 to 540. However, the configuration is not limited thereto. The number of predetermined positions to be perforated may be two or more. Alternatively, the perforation may be performed sequentially on a plurality of predetermined positions by using one needle-shaped member.

The number of through holes 701 formed in the overlapping portion 600 is not particularly limited as long as the number of through holes 701 is two or more. The number of through holes 701 is preferably 2 to 4. When the number of through holes 701 is greater than 4, the through holes 701 do not contribute to improvement of ensuring the electric connection, and the mechanical strength of the lead member 400 and the anode foil 300 is likely to be low. More preferably, the number of through holes 701 is 3 or 4.

As the size of each through hole 701, for example, the through hole 701 has a maximum diameter of 0.5 mm or more and 1.2 mm or less, or may have a maximum diameter of 0.7 mm or more and 1 mm or less. When the maximum diameter of the through hole is 0.5 mm or more, the electric connection is likely to be ensured. When the maximum diameter of the through hole is 1.2 mm or less, the connection strength of the lead member and the anode body is likely to be maintained. The plurality of through holes 701 may have different sizes.

From the viewpoint of connection strength between the anode foil 300 and the lead member 400, the distance between through holes may be 0.8 mm or more, or 1 mm or more. From the viewpoint of electric connection, the distance between through holes may be 3 mm or less (or 2 mm or less).

In the first step, an anode foil 300 that has pre-through holes at positions corresponding to the predetermined positions to be perforated may be prepared. By using the anode foil 300 that has pre-through holes, the mechanical stress applied locally to the anode foil 300 during connection can be mitigated. The maximum diameter of each pre-through hole is not particularly limited, and may be 1 to 2 times or 1 to 1.7 times the area of a through hole formed at a position corresponding to the pre-through hole.

(Others)

The production method according to the embodiment of the present disclosure may also include: a step of cutting the anode foil into a predetermined size prior to the third step; and a step of subjecting an end face (cut plane) of the anode foil cut into the predetermined size to a first chemical conversion treatment at a first chemical conversion voltage. Through the first chemical conversion treatment, a first oxide coating film that covers the end face of the anode foil is formed. The first chemical conversion treatment is performed in the case where the electrolytic capacitor contains a solid electrolyte (conductive polymer) for the purpose of reducing leakage current, achieving a high withstand voltage, and the like. The first chemical conversion treatment is usually performed after the third step, and is performed on a spirally wound body that includes the anode foil to which the anode lead member (tab portion) is connected.

Due to the shape of the surface S of the tab portion, many contact points are formed between the tab portion and the anode foil, and the resistance at the connection portion is reduced. Accordingly, a large current that locally flows during the first chemical conversion treatment is suppressed, and the first chemical conversion treatment is performed in a stable manner, as a result of which deterioration of the crimping portion is suppressed.

In the second step, the surface of the tab portion may be subjected to a second chemical conversion treatment at a second chemical conversion voltage. In this case, through the second chemical conversion treatment, a second oxide coating film that covers the surface of the tab portion is formed. In this case, the resistance at the crimping portion is likely to be large, which causes a large current to flow locally and generate heat, and thus the spirally wound body (capacitor element) is likely to undergo corrosion. Accordingly, in this case, it is very important to form many contact points between the electrode foil and the tab portion at the crimping portion by the surface S of the tab portion, and the resistance reducing effect produced by forming many contact points between the electrode foil and the tab portion by the surface S of the tab portion can be obtained remarkably.

Even when the second oxide coating film has a relatively large thickness T2 (second chemical conversion voltage V2), with the surface S of the tab portion, many contact points can be formed between the electrode foil and the tab portion at the crimping portion during pressing in the third step. For example, in the case of a medium-voltage or high-voltage electrolytic capacitor, the second oxide coating film may have a relatively large thickness T2 (second chemical conversion voltage V2). Also, the second oxide coating film may have a thickness T2 (second chemical conversion voltage V2) larger than the thickness T1 (first chemical conversion voltage V1) of the first oxide coating film.

The production method according to the embodiment of the present disclosure may also include a step of preparing a cathode foil to which a cathode lead member is connected. In the case where the cathode foil has a roughened surface, the cathode foil to which a cathode lead member is connected may be obtained through the first to third steps.

The production method according to the embodiment of the present disclosure may also include a step of spirally winding the anode foil and the cathode foil with a separator interposed between the anode foil and the cathode foil to form a spirally wound body. The outermost circumference of the spirally wound body may be fixed using fixing tape. The anode lead member and the cathode lead member are connected to the anode foil and the cathode foil, respectively, and the anode foil and the cathode foil are spirally wound with the anode lead member and the cathode lead member being on the inside to form a spirally wound body.

The production method according to the embodiment of the present disclosure may also include a step of causing the spirally wound body to contain an electrolyte to obtain a capacitor element. The electrolyte may contain a solid electrolyte (conductive polymer), or may be an electrolyte solution. The spirally wound body may contain an electrolyte solution or a solvent (for example, a polyol compound) together with the solid electrolyte. The solid electrolyte contains a conductive polymer, and may contain a conductive polymer doped with a dopant.

Hereinafter, the present disclosure will be described in further detail based on examples. However, the present disclosure is not limited to the examples given below.

Examples 1 to 4

In each of Examples 1 to 4, a spirally wound electrolytic capacitor with a rated voltage of 250 V and a rated capacitance of 6.8 µF (with a diameter of 10 mm and a length of 12 mm) was produced in the following procedure.
(First Step: Production of Anode Foil)

Anode foils No. 1 and No. 2 (with a thickness of thickness 100 µm) were produced.

The anode foil No. 1 included a porous portion having tunnel-shaped pits on both surfaces of the anode foil (the porous portion having a thickness per side of 20 µm, and the pits having a most frequent pore size of 110 nm), and the surface of the porous portion was covered with a dielectric layer (with a thickness of 450 nm). The anode foil No. 2 included a porous portion having sponge-shaped pits on both surfaces of the anode foil (the porous portion having a thickness per side of 33 µm, and the pits having a most frequent pore size of 65 nm), and the surface of the porous portion was covered with a dielectric layer (with a thickness of 450 nm).

or the like to form a tab portion (with a thickness of 250 µm). The other end of the rod-shaped metal material was used as as a connection member. The other end used as the connection member (the rod-shaped portion of the rod-shaped metal material) and the lead wire were connected through a welding method. In this way, an anode lead member including the tab portion, the connection member, and the lead wire was obtained.

Furthermore, the surface of the tab portion was subjected to electrolytic etching processing, and then to a second chemical conversion treatment at a second chemical conversion voltage V2 of 200 V to form a second oxide coating film (with a thickness of 280 µm) on the surface of the tab portion. At this time, the arithmetic average roughness Ra and the maximum height roughness Rz of the surface of the tab portion were adjusted to be the values shown in Table 1. The surface roughness of the tab portion was adjusted by adjusting the etching conditions. In this way, anode lead members Nos. 1 to 3 shown in Table 1 were obtained.
(Third Step: Connection of Anode Foil and Anode Lead Member)

The tab portion of an anode lead member was placed on an anode foil at a predetermined position to form an overlapping portion. Four needle-shaped members with a square cross section was arranged in one line along the long side direction of the overlapping portion, and the overlapping portion was perforated simultaneously using the needle-shaped members. Then, the overlapping portion was pressed to connect the anode foil and the anode lead member at four crimping portions. In this way, a sample of an anode foil to which an anode lead member was connected was obtained.

The anode foils Nos. 1 and 2 and the anode lead members Nos. 1 to 3 produced in the above-described manner were combined as shown in Table 1, and the anode foils and the anode lead members were connected. In this way, the anode foils to which the anode lead members were connected were obtained as samples a1 to a4.

TABLE 1

| | | Anode foil | | | | Anode lead member | | |
| | | | | | | | Surface of tab portion | |
| | | Pit shape | Chemical | Thickness | | | | |
| Sample | No. | in porous portion | conversion voltage (V) | of dielectric layer (nm) | No. | Etching treatment | Arithmetic average roughness Ra (µm) | Maximum height roughness Rz (µm) |
|---|---|---|---|---|---|---|---|---|
| a1 | 1 | Tunnel shape | 320 | 450 | 1 | Performed | 5.4 | 38.3 |
| a2 | 1 | Tunnel shape | 320 | 450 | 2 | Performed | 8.2 | 51.0 |
| a3 | 1 | Tunnel shape | 320 | 450 | 3 | Performed | 4.5 | 30.9 |
| a4 | 2 | Sponge shape | 320 | 450 | 1 | Performed | 5.4 | 39.8 |
| b1 | 1 | Tunnel shape | 320 | 450 | 4 | Not performed | 2.1 | 18.8 |
| b2 | 2 | Sponge shape | 320 | 450 | 5 | Not performed | 1.7 | 16.0 |

The porous portion was formed by performing electrolytic etching processing on an Al foil with a thickness of 100 µm. The thickness of the porous portion, and the shape and the size of the pits were controlled by adjusting etching conditions (the number of steps performed in etching processing, current density, the composition and the temperature of etching solution, and the like). The dielectric layer was formed by subjecting the Al foil having the porous portion on each surface to a chemical conversion treatment at a chemical conversion voltage of 320 V. The anode foil was cut into a predetermined size and used.
(Second Step: Production of Anode Lead Member)

A rod-shaped metal material was prepared, and one end of the rod-shaped metal material was flattened through pressing (Production of Spirally Wound Body)

An anode foil to which an anode lead member was connected and a cathode foil to which a cathode lead member was connected were spirally wound with a separator interposed therebetween, with the anode lead member and the cathode lead member being on the inside to form a spirally wound body. The samples a1 to a4 were used as the anode foil to which the anode lead member was connected. As the cathode foil, an Al foil (with a thickness of 50 µm) whose surface had been roughened through etching processing and that had been cut into a predetermined size was used.
(First Chemical Conversion Treatment)

The obtained spirally wound body was again subjected to a chemical conversion treatment (first chemical conversion treatment) to form a first oxide coating film (with a thickness of 480 nm) composed of a dielectric layer on the cut plane of the anode foil. The first chemical conversion treatment was performed at a first chemical conversion voltage of 320 V. Next, the end portion of the outer surface of the spirally wound body was fixed using fixing tape.

(Production of Capacitor Element)

The spirally wound body was impregnated with a conductive polymer dispersion liquid in a predetermined container under a reduced pressure atmosphere, and then dried to form a solid electrolyte layer containing a conductive polymer (PEDOT/PSS) between the anode foil and the cathode foil. In this way, a capacitor element was obtained.

(Sealing of Capacitor Element)

The capacitor element was housed in a bottomed case, and sealed by using a sealing member and a cover plate. In this way, an electrolytic capacitor was produced. After that, the electrolytic capacitor was subjected to predetermined aging processing while applying a rated voltage.

In Table 2, A1 to A4 represent electrolytic capacitors of Examples 1 to 4 including the samples a1 to a4, respectively.

Comparative Examples 1 and 2

Anode lead members Nos. 4 and 5 were obtained in the same manner as the anode lead member No. 1, except that, in the second step (the step of producing an anode lead member), the surface of the flat portion was not roughened in etching processing. The arithmetic average roughness Ra and the maximum height roughness Rz of the surface of the tab portion were adjusted to be the values shown in Table 1.

Samples b1 and b2 were obtained in the same manner as the sample a1, except that the anode foils Nos. 1 and 2 and the anode lead members Nos. 4 and 5 were combined as shown in Table 1.

Electrolytic capacitors B1 and B2 were obtained in the same manner as the electrolytic capacitor A1, except that the samples b1 and b2 were used instead of the sample a1. In Table 2, B1 and B2 represent electrolytic capacitors of Comparative Examples 1 to 2 including the samples b1 and b2.

[Evaluation]

(Resistance at Crimping Portion)

For each of the samples a1 to a4 and the samples b1 and b2, the resistance (mΩ) at the connection portion (crimping portion) between the anode foil and the lead member was measured by using the method described above. In each of Examples and Comparative Examples, three samples were produced, and the average value of the measured values of the three samples was obtained.

(Defect Rate)

One hundred spirally wound bodies that had undergone the first chemical conversion treatment were prepared, and each spirally wound body was again subjected to a chemical conversion treatment at the same chemical conversion voltage (320 V) as that used in the chemical conversion treatment performed in the step of producing an anode foil (first step). At this time, the ratio of the number of spirally wound bodies in which a corrosion or a spark mark was observed was determined as defect rate (%).

(ESR and Breakdown Withstand Voltage)

For each of the electrolytic capacitors A1 to A4 and the electrolytic capacitors B1 and B2, ESR (mΩ) was measured at a frequency of 100 kHz. Also, breakdown withstand voltage (V) was measured by applying voltage while increasing the voltage at a rate of 1.0 V/sec to cause an overcurrent of 0.5 A to flow through the electrolytic capacitor.

The evaluation results are shown in Table 2.

TABLE 2

| | | Evaluation | | | |
|---|---|---|---|---|---|
| Electrolytic capacitor | Sample | Resistance at crimping portion (mΩ) | Defect rate (%) | ESR (mΩ) | Breakdown withstand voltage (V) |
| A1 | a1 | 0.45 | 0 | 43.6 | 454 |
| A2 | a2 | 0.32 | 0 | 39.0 | 474 |
| A3 | a3 | 0.75 | 0 | 45.8 | 471 |
| A4 | a4 | 0.97 | 0 | 61.4 | 393 |
| B1 | b1 | 1.55 | 4 | 76.0 | 345 |
| B2 | b2 | 1.89 | 7 | 99.0 | 333 |

In the samples a1 to a4, the resistance at the crimping portion was reduced as compared with that of the samples b1 and b2.

When the sample a1 and the sample b1 in each of which an anode foil with a porous portion having tunnel-shaped pits was used are compared, it can be seen that, in the sample a1, the resistance at the crimping portion was reduced to about 3/10 of that of the sample b1. When the sample a4 and the sample b2 in each of which an anode foil with a porous portion having sponge-shaped pits was used are compared, it can be seen that, in the sample a4, the resistance at the crimping portion was reduced to about ½ of that of the sample b2. It has been confirmed from the sample a1 and the sample a4 that the resistance at the crimping portion can be reduced by using the lead member No. 1, and the effect of reducing the resistance at the crimping portion produced by using the lead member No. 1 can be more remarkably observed in the case of the sample a1 in which the anode foil No. 1 with a porous portion having tunnel-shaped pits was used.

In the spirally wound bodies including the samples a1 to a4, the defect rate was reduced as compared with that of the spirally wound bodies including the samples b1 and b2. In the electrolytic capacitors A1 to A4 including the samples a1 to a4, ESR was reduced, and a larger breakdown withstand voltage was obtained, as compared with those of the electrolytic capacitors B1 and B2 including the samples b1 and b2,

INDUSTRIAL APPLICABILITY

The present disclosure can be suitably used in an electrolytic capacitor required to have low ESR.

The present invention has been described in terms of the presently preferred embodiment, but the disclosure should not be interpreted as limiting. Various alterations and modifications will no doubt become apparent to those skilled in the art to which the present invention pertains, after having read the disclosure. Accordingly, it is to be understood that the appended claims be interpreted as covering all alterations and modifications which fall within the true spirit and scope of the present invention.

REFERENCE SIGNS LIST

10: anode foil
20: cathode foil
30: separator

40: fixing tape
50A, 50B: lead tab
60A, 60B: lead wire
100: spirally wound body
200: electrolytic capacitor
211: bottomed case
212: sealing member
213: cover plate
300: anode foil
311: core portion
312, 312a, 312b: porous portion
400: lead member
411: protruding portion
425: tab portion
426: connection member
427: lead wire
500, 510, 520, 530, 540: needle-shaped member
510x: predetermined position to be perforated
600: overlapping portion
610: opening
700: crimping portion
701: through bole
710: first crimping portion
711: first through hole
720: second crimping portion
721: second through hole
730: third crimping portion
731: third through hole
740: fourth crimping portion
741: fourth through hole
702, 712, 722, 732, 742: crimping piece

The invention claimed is:

1. An electrolytic capacitor comprising:
an electrode foil; and
a lead member that is connected to the electrode foil,
wherein the lead member includes a lead wire and a
plate-shaped tab portion that is provided at one end
portion of the lead wire,
the tab portion has a surface with an arithmetic average
roughness Ra of 4 $\mu$m or more,
the electrode foil and the lead member are connected by
a crimping portion in an overlapping portion in which
the tab portion and the electrode foil overlap each other
when the electrode foil is placed on the surface of the
tab portion, and
the surface of the tab portion has a maximum height
roughness Rz of 30 $\mu$m or more.

2. The electrolytic capacitor in accordance with claim 1,
wherein the surface of the tab portion has an arithmetic
average roughness Ra of 8 $\mu$m or more.

3. The electrolytic capacitor in accordance with claim 1,
wherein the tab portion has a thickness of 200 $\mu$m or more.

4. The electrolytic capacitor in accordance with claim 1,
wherein the surface of the tab portion is covered with an
oxide coating film.

5. The electrolytic capacitor in accordance with claim 4,
wherein the oxide coating film has a thickness of 280 nm
or more.

6. The electrolytic capacitor in accordance with claim 1,
wherein the electrode foil includes a metal foil that
includes a porous portion in a surface thereof and a
dielectric layer that covers the porous portion.

7. The electrolytic capacitor in accordance with claim 6,
wherein the electrode foil has a thickness of 75 $\mu$m or
more.

8. The electrolytic capacitor in accordance with claim 6,
wherein the porous portion has a thickness of 25 $\mu$m or
more.

9. The electrolytic capacitor in accordance with claim 6,
wherein the dielectric layer has a thickness of 450 nm or
more.

10. The electrolytic capacitor in accordance with claim 6,
wherein the porous portion includes a plurality of tunnel-
shaped pits that extend in a thickness direction of the
porous portion.

11. The electrolytic capacitor in accordance with claim
10,
wherein the pits have a most frequent pore size of 50 nm
or more.

12. The electrolytic capacitor in accordance with claim 1,
wherein the electrolytic capacitor has a rated voltage of
160 V or more.

13. A method for producing an electrolytic capacitor
comprising:
a first step of preparing an electrode foil;
a second step of obtaining a lead member that includes a
lead wire and a plate-shaped tab portion that is pro-
vided at one end portion of the lead wire and has a
surface with an arithmetic average roughness Ra of 4
$\mu$m or more; and
a third step of placing the electrode foil on a surface of the
tab portion to form an overlapping portion in which the
tab portion and the electrode foil overlap each other,
perforating the tab portion in the overlapping portion at
a predetermined position, and crimping the electrode
foil and the tab portion to connect the electrode foil and
the lead member to each other,
wherein in the first step, the electrode foil that includes a
metal foil that includes a porous portion in a surface
thereof and a dielectric layer that covers the porous
portion is prepared as an anode foil, and
in the second step, the lead member is obtained as an
anode lead member,
the method further including:
a step of cutting the anode foil into a predetermined size
prior to the third step; and
a step of subjecting an end face of the anode foil cut into
the predetermined size to a first chemical conversion
treatment at a first chemical conversion voltage after
the third step,
wherein, in the second step, the surface of the tab portion
is subjected to a second chemical conversion treatment
at a second chemical conversion voltage, and
the second chemical conversion voltage is larger than the
first chemical conversion voltage.

14. The method for producing an electrolytic capacitor in
accordance with claim 13,
wherein the surface of the tab portion is subjected to
roughening processing.

15. The method for producing an electrolytic capacitor in
accordance with claim 13,
wherein the surface of the tab portion is subjected to a
chemical conversion treatment.

16. The method for producing an electrolytic capacitor in
accordance with claim 13, comprising:
a step of preparing a cathode foil to which a cathode lead
member is connected; and
a step of spirally winding the anode foil and the cathode
foil with a separator interposed between the anode foil
and the cathode foil to form a spirally wound body.

17. A method for producing an electrolytic capacitor
comprising:

US 12,688,976 B2

19 a first step of preparing an electrode foil;

a second step of obtaining a lead member that includes a lead wire and a plate-shaped tab portion that is provided at one end portion of the lead wire and has a surface with an arithmetic average roughness Ra of 4 μm or more; and a third step of placing the electrode foil on a surface of the tab portion to form an overlapping portion in which the tab portion and the electrode foil overlap each other, perforating the tab portion in the overlapping portion at a predetermined position, and crimping the electrode foil and the tab portion to connect the electrode foil and the lead member to each other, wherein in the first step, the electrode foil that includes a metal foil that includes a porous portion in a surface thereof and a dielectric layer that covers the porous portion is prepared as an anode foil, and in the second step, the lead member is obtained as an anode lead member,

the method further including:

a step of cutting the anode foil into a predetermined size prior to the third step; and a step of subjecting an end face of the anode foil cut into the predetermined size to a first chemical conversion treatment at a first chemical conversion voltage after the third step, wherein, in the second step, the surface of the tab portion is subjected to a second chemical conversion treatment at a second chemical conversion voltage, a first oxide coating film that covers the end face of the anode foil is formed through the first chemical conversion treatment, a second oxide coating film that covers the surface of the tab portion is formed through the second chemical conversion treatment, and the second oxide coating film is thicker than the first oxide coating film.

* * * * *